March 14, 1950  B. AXELROD  2,500,598
METHOD OF EMBEDDING DISPLAY SHEETS IN PLASTICS
Filed July 5, 1947
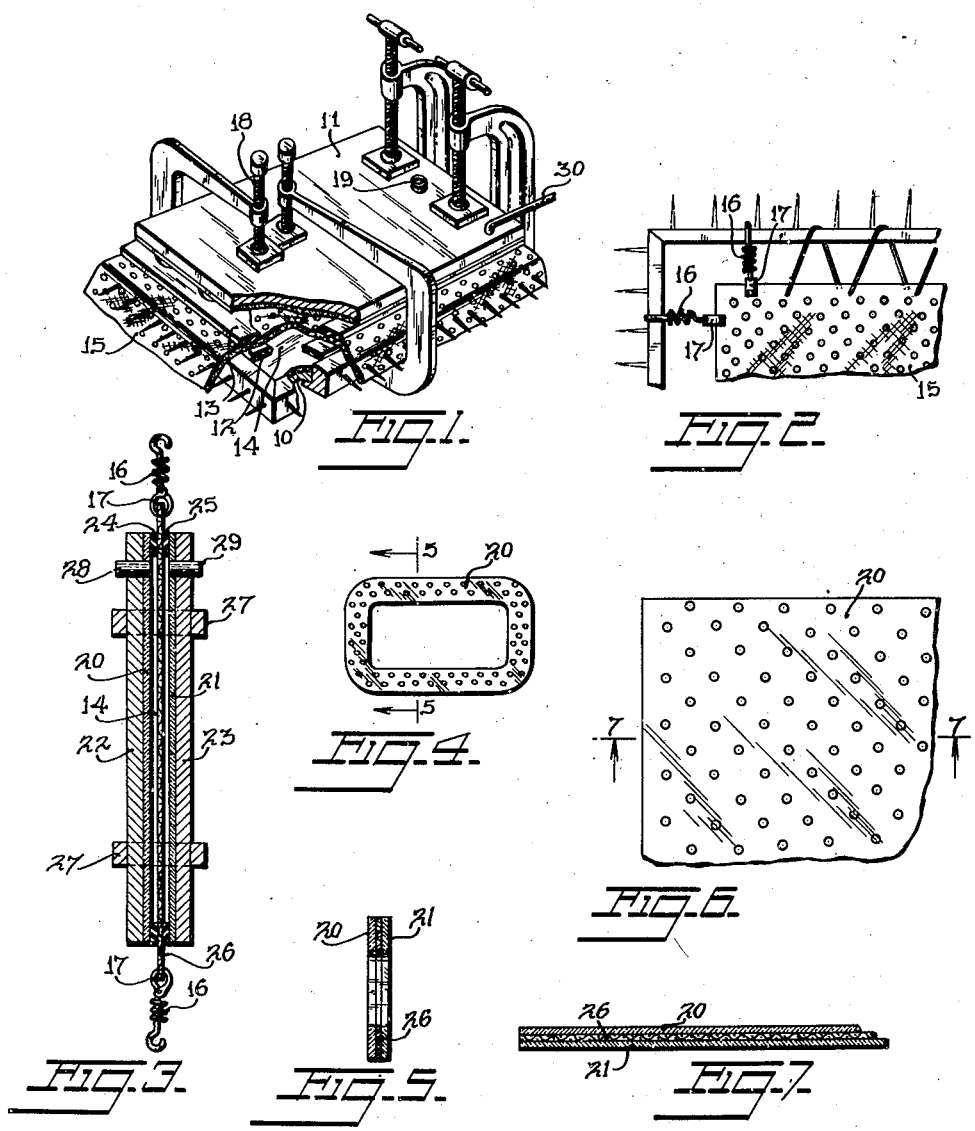
INVENTOR.
BERNARD AXELROD
ATTORNEY Patented Mar. 14, 1950

2,500,598

UNITED STATES PATENT OFFICE 2,500,598

METHOD OF EMBEDDING DISPLAY SHEETS IN PLASTICS

Bernard Axelrod, Perth Amboy, N. J.

Application July 5, 1947, Serial No. 759,083

4 Claims. (Cl. 18—59)

This invention relates to a method of embedding display mediums in plastic, so as to provide a transparent plastic sheet or body making material having a decorative or display sheet or medium embedded therein, from which innumerable service articles like buckles, picture frames, buttons and other types of articles may be produced by subsequent molding and fabricating.

One of the objects of the invention is to provide a method for producing plastic bodies by the use of printed or woven fabric sheet material embedded in the plastic material, by casting the plastic material upon the fabric while the latter is maintained under tension in all directions, so that buttons can be made from fabric of which a dress or suit is made and other articles may be made by the use of fabric designs, thus eliminating expensive dies and tooling operations.

Another object of the invention is to provide an apparatus for casting transparent plastic material in sheet form against the opposite sides of a fabric sheet maintained under tension, so that the two layers of plastic will be bonded to each other through the fabric sheet and the fabric sheet will be visible through the transparent plastic layers after the same have been hardened in the customary manner.

For further comprehension of the invention, and of the objects and advantages thereof, reference will be had to the following description and accompanying drawing and to the appended claims in which the various novel features of the invention are more particularly set forth.

In the accompanying drawing forming a material part of this disclosure:

Fig. 1 is a perspective view showing one form of the apparatus for carrying out the method for embedding design material in cast plastic.

Fig. 2 is a similar view illustrating one form of the sheet tensioning means.

Fig. 3 is a vertical sectional view showing a vertical method step for casting the plastic.

Fig. 4 is a detail plan view of a buckle frame molded from the sheet plastic produced by the improved method.

Fig. 5 is a cross sectional view thereof, taken on line 5—5 of Fig. 4, looking in the direction of the arrows.

Fig. 6 is a fragmentary plan view of a cast plastic sheet.

Fig. 7 is a detail cross sectional view thereof taken on line 7—7 of Fig. 6, looking in the direction of the arrows.

Referring to the drawing, which illustrates the apparatus for carrying out the improved method, 10 designates one wall of the mold and 11 the companion wall of the mold. These walls are made of plate glass or of sheet metal having a polished service side. The mold walls 10 and 11 are spaced apart from each other by the use of thin rubber or other suitable gasket strips or frames 12 and 13, each of which forms a complete frame and which is secured by a suitable adhesive to the service side of the mold wall. One of these frames is disposed in opposition to the other frame, so that a mold cavity 14 is formed between the confronting service faces of the mold walls 10 and 11.

A sheet of fabric 15, carrying a favored design, is disposed between the gasket or sealing frames 12 and 13, midway of the confronting service faces of the mold walls 10 and 11. This fabric is held under tension by means of the springs 16 and the pulling clamps 17. The mold walls 10 and 11 are clamped in place to maintain their spaced relation by means of the screw clamps 18 or other equivalent means.

Pouring or intake nipples 19 are provided on the mold walls 10 and 11, and then plastic material is forced into the cavity of the mold, so as to completely fill this cavity and embed the fabric design sheet in the material as it hardens.

When the material hardens, it is tempered in an oven or by any other suitable means. The polyester materials have been found to give excellent results and the preferred polyester is the one prepared by the Pittsburgh Plate Glass Co. and available on the market under the name "Selectron." The thinner the sheets to be cast the more catalyzer is used.

When the cast material has been hardened, a finished product is produced which does not require expensive polishing, and the design embodied in the cast plastic material is that provided by the embedded design fabric. The cast material may be colorless or provided with a color blending with or matching that of the embedded fabric.

Should curved forms or bodies be desired, the walls of the mold would be shaped to give the necessary curvature.

Fig. 3 shows a vertical method step, wherein flat glass sheets 20 and 21 are used and backing plates or boards 22 and 23 are provided. The plates 20 and 21 are spaced apart from each other by means of the gasket frames 24 and 25 and the fabric sheet 26 is supported between these frames in spaced relation to the plates 20 and 21 and held under tension by the pressure bars 27 acting on all sides thereof.

Plastic material is admitted to the mold cavity between the mold plates 20 and 21 on opposite sides of the fabric sheet 26 through the nipples 28 and 29 at the required temperature and pressure. This plastic material is of the type known as casting plastics and a great variety of such materials may be used in carrying out the improved method.

The gasket frames should be able to safely withstand or resist temperatures 300° to 500° F. without distortion or disintegration.

In casting the plastic material at the required temperature, air bubbles are evacuated by any suitable means as by gravity displacement or by maintaining a suction pressure in the mold cavity by means of the suction pipe 30, so that the internal pressure of the mold cavity will be below atmospheric pressure and the air bubbles will separate readily from the plastic.

When the product is finished it may be pressure molded between suitable dies to produce buckles, picture frames, buttons and other articles. Such articles will display the fabric or other sheet material which has been embedded in the cast plastic material.

The sheet material to be permanently embedded in the plastic material may be fabric of any pattern or design, plastic sheet with any design or pattern arrangement, paper, or even metal. The material thus embedded, especially in the case of fabric, forms a reinforcement for the plastic mass.

In casting the plastic material against the opposite sides of the stretched fabric sheet, the plastic material enters the pores of the fabric sheet and bonds itself to the fabric through these pores, so that the two plastic layers on opposite sides of the fabric sheet are thereby bonded to each other.

While I have illustrated and described the preferred embodiments of my invention it is to be understood that I do not limit myself to the precise constructions herein disclosed and the right is reserved to all changes and modifications coming within the scope of the invention as defined in the appended claims.

Having thus described my invention what I claim as new, and desire to secure by United States Letters Patent is:

1. The method of producing plastic bodies consisting in casting plastic material in a mold having glass plates spaced from each other and supporting a sheet of material stretched under tension in all directions between the plates so that the cast plastic material adheres to the two sides of said sheet of material.

2. The method of producing plastic bodies consisting in casting plastic material between glass plates spaced from each other to provide a mold cavity, maintaining a sheet of design fabric material stretched under tension in all directions in a parallel relation between the glass plates, and filling said mold with plastic material to enclose said fabric in said plastic material.

3. The method of producing plastic bodies consisting in casting plastic material between glass plates spaced from each other by sealing frames disposed between the plates which determine the thickness of the material cast and maintaining a sheet of design fabric material stretched under tension in all directions between the sealing frames so that the cast plastic is bonded to said fabric material on both sides thereof.

4. The method of producing polished plastic bodies consisting in supporting polished glass plates in spaced relation to each other, disposing between said plates sealing frames to establish a mold cavity between the plates, supporting a design fabric sheet between the plates and equally spaced from the sheet under tensional pull in all directions, and casting a plastic material in said mold cavity against opposite sides of the fabric sheet, whereby said fabric sheet is embedded within said plastic material and impregnated to bond together the plastic material on opposite sides of said fabric sheet.

BERNARD AXELROD.

REFERENCES CITED

The following references are of record in the file of this patent:

UNITED STATES PATENTS

| Number | Name | Date |
| --- | --- | --- |
| 1,454,845 | Clay | May 15, 1923 |
| 1,655,677 | Dickie | Jan. 10, 1928 |
| 1,815,234 | Byck | July 21, 1931 |
| 1,870,661 | Vogt | Aug. 9, 1932 |
| 2,071,907 | Tattersall | Feb. 23, 1937 |
| 2,373,488 | Marks | Apr. 10, 1945 |
| 2,397,231 | Barnes | Mar. 26, 1946 |